United States Patent
Therani et al.

(10) Patent No.: US 11,403,324 B2
(45) Date of Patent: Aug. 2, 2022

(54) METHOD FOR REAL-TIME COHORT CREATION BASED ON ENTITY ATTRIBUTES DERIVED FROM PARTIALLY OBSERVABLE LOCATION DATA

(71) Applicant: Near Pte. Ltd., Singapore (SG)

(72) Inventors: Madhusudan Therani, San Jose, CA (US); Anil Mathews, Bangalore (IN)

(73) Assignee: Near Intelligence Holdings, Inc., Pasadena, CA (US)

( * ) Notice: Subject to any disclaimer, the term of this patent is extended or adjusted under 35 U.S.C. 154(b) by 238 days.

(21) Appl. No.: 16/792,231

(22) Filed: Feb. 15, 2020

(65) Prior Publication Data

US 2021/0256037 A1 Aug. 19, 2021

(51) Int. Cl.
- G06F 17/00 (2019.01)
- G06F 16/28 (2019.01)
- G06F 16/215 (2019.01)
- G06F 16/21 (2019.01)
- G06N 20/00 (2019.01)
- G06Q 30/02 (2012.01)
- H04W 4/02 (2018.01)

(52) U.S. Cl.
CPC .......... *G06F 16/285* (2019.01); *G06F 16/215* (2019.01); *G06F 16/219* (2019.01); *G06N 20/00* (2019.01); *G06Q 30/0201* (2013.01); *G06Q 30/0271* (2013.01); *H04W 4/025* (2013.01)

(58) Field of Classification Search
CPC .... G06F 16/285; G06F 16/215; G06F 16/219; G06F 16/2474; G06F 16/2477; G06N 20/00; G06Q 30/0201; G06Q 30/0271; H04W 4/025
See application file for complete search history.

(56) References Cited

U.S. PATENT DOCUMENTS 10,120,765 B1 * 11/2018 Whitmer ............. G06F 11/1469
2008/0215546 A1 * 9/2008 Baum ................. G06F 16/2322
(Continued)

OTHER PUBLICATIONS

Cordeiro, Mario, and Gama, Joao, "Online Social Networks Event Detection: A Survey", In Solving Large Scale Learning Tasks. Challenges and Algorithms, pp. 1-41, Springer, Cham, (Year: 2016).*

*Primary Examiner* — Greta L Robinson

(57) ABSTRACT

A system for real time cohort creation of entities based on entity attributes derived from partially observable location data is provided. The system (i) obtains, in real time, one or more data streams from one or more independently controlled entity sources that include a unique entity identifier, entity attributes, time-stamp data, location indexed data (ii) de-duplicates the one or more data streams associated with an entity by analyzing the entity attributes associated with the unique entity identifier, (iii) classifies a unified entity event from the one or more data streams along with dynamic entity attributes retrieved from a memory store, and storing the dynamic attributes in an entity attribute document of the entity (iv) reverse searches, to match the entity attribute document with at least one query (v) generates entity cohorts based on the matched entity attribute document of the entities with at least one cohort labels and communicates a target media content to the entity cohorts over a network.

20 Claims, 12 Drawing Sheets

(56) References Cited

U.S. PATENT DOCUMENTS

| | | | |
|---|---|---|---|
| 2013/0347005 A1* | 12/2013 | Lam | G06F 9/4881 |
| | | | 719/318 |
| 2018/0032938 A1* | 2/2018 | Scriffignano | G06K 9/6277 |
| 2019/0196795 A1* | 6/2019 | Cavalier | G06F 9/45512 |
| 2019/0341153 A1* | 11/2019 | Ng | G16H 50/50 |
| 2021/0313049 A1* | 10/2021 | Khan | G16H 50/70 |

* cited by examiner

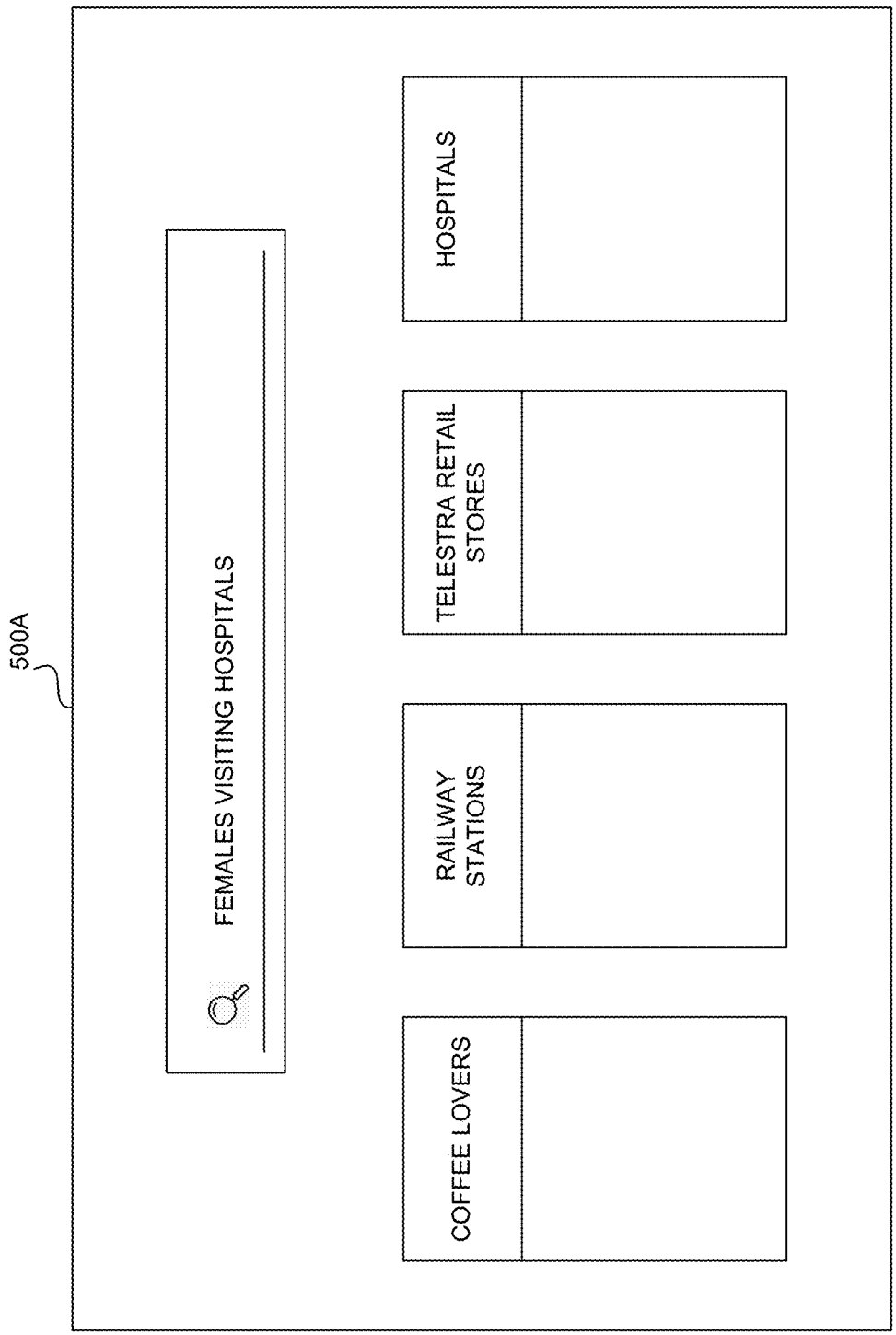

METHOD FOR REAL-TIME COHORT CREATION BASED ON ENTITY ATTRIBUTES DERIVED FROM PARTIALLY OBSERVABLE LOCATION DATA

BACKGROUND

Technical Field

The embodiments herein generally relate to real time cohort creation, and more specifically to an automatic system and method for performing real-time spatio temporal cohort creation of entities based on entity attributes that are derived from partially observable location data.

Description of the Related Art

Today's entities are now engaged on their smartphones, laptops, tablets, wearable fitness bands, etc. across countless applications, browsers, emails and more. In recent times where an entity data is more advanced and greater in size than ever before, having a better understanding of an entity remains essential for meaningful engagement with them. Segmentation of entities is much more powerful when utilizing valuable touchpoints to create a full profile of an ideal entity, and then deliver relevant engagement messages to a hyper-local, targeted group of entities based on unique campaign goals. With more technology available, understanding an entity on a deeper level provides personalized engagement experiences. Collecting behavioral information of entities involves actively listening to targeted entities to develop a deeper understanding of the entity behaviors, interests, and media preferences. The collection of behavioral information includes gathering offline entity data, such as purchase behaviors, online entity data such as website activity etc.

Further, the powerful combination of entity data allows customizing entity cohorts to maximize entity engagement and drive marketing campaign success. Some of the existing technologies focus on entity segmentation based on the frequency of website activity of the entity in an offline mode. Some other existing technologies segment the entities based on proximity of location histories of the entities, location visit history of the entities in an offline mode. Existing methodologies create clusters of entities based on adjacent locations that satisfy both a distance and a temporal window criterion and creates cohorts from these clusters of entities. However, this may not be used for profiling entity's sets of attributes and focusing on delivering engagement messages to entities based on the proximity of visits to a location.

Further, much of the data obtained in the data streams is either partial or inaccurate/noisy. This partial data is referred to as data exhaust or exhaust data, which is the trail of data left by the activities of the internet or other computer system entities during their online activity, behavior, and transactions. This category of unconventional data includes geospatial, network, and time-series data which may be useful for predictive purposes. An enormous amount of raw data is created, which can be in the form of cookies, temporary files, log files, storable choices, and more. The difficulty in processing exhaust data is getting a single holistic view of it wherein cleaning up and unifying that data remains a challenge. Hence, the scaling and unification of these large and high-speed data streams is essential and requires to be done in real-time, as it is impossible to be done by a human being because of the sheer size of the data and also because the data has a shelf-life.

Further, data points on human activity are scalable as the number of entities uses multiple devices such as a phone, a television, a personal computer, etc. Each entity may use one to ten mobile applications across multiple devices. Hence the requirement of scaling is essential for processing data points on human activity. Also, in some scenarios there may be a need to sample effectively (possibly by discarding some portions of data) for supporting scalability, as the time available to make a decision is decreasing and the flow of the data is increasing. Existing methodologies may do this for multiple streams but those streams are controlled by the same entity.

Accordingly, there remains a need for a system and method for performing real-time spatio temporal cohort creation of entities based on entity attributes derived from partially observable location data which is computationally more efficient even the data is partially observable and also time available to take decision is limited. The system and method support the practical application of communicating a target media content to an identified entity cohort.

SUMMARY

In view of the foregoing, an embodiment herein provides a method of real time cohort creation of entities based on entity attributes derived from partially observable location data. The method includes the steps of (i) obtaining, in real time, one or more data streams from one or more independently controlled data sources, wherein the one or more data streams include a unique entity identifier, entity attributes, time-stamp data, location indexed data and the one or more data streams partially characterizes an activity of an entity associated with the unique entity identifier; (ii) de-duplicating the one or more data streams associated with the entity from one or more independently controlled data sources by analyzing the entity attributes associated with the unique entity identifier; (iii) classifying a unified entity event from the one or more data streams along with dynamic entity attributes retrieved from a memory store, wherein the unified entity event includes values of the entity attributes; (iv) updating one or more entity attribute documents associated with one or more entities by storing the values of the entity attributes from the unified entity event temporally, wherein a new entity attribute document and a new unique entity identifier is created for a new entity in real-time; (v) reverse searching to match the one or more entity attribute documents associated with the one or more entities with a collection of queries for profiling each of the one or more entities, wherein the collection of queries includes cohort definition with at least one entity attributes specified in Boolean logic and the one or more entity attribute documents include all values of the entity attributes that have been captured historically; and (vi) generating, using a cohort creation module, entity cohorts with at least one cohort label based on matching between the one or more entity attribute document and the collection of queries, wherein the entity cohorts are identified based on a searched cohort definition.

In an embodiment, the one or more collection of rules is associated with the dynamic entity attributes and static entity attributes to account for scalability of new attributes that become available.

In yet another embodiment, the method enables integration of one or more distributed data sources and new events in real-time without interrupting the flow of the ongoing method. The profiling is performed selectively for the one or more entities whose values of entity attributes in their entity attribute document have changed above a predefined threshold.

In another embodiment, the entity attributes include at least one of a countable attribute, a categorical attribute, an ordinal, a location, a spatial, or a temporal behavior of an entity. The countable attribute includes at least one of (i) spend levels, or (ii) a frequency of visits. The categorical attribute includes at least one of (i) a gender, (ii) age-groups, (iii) a content, or (iv) a content type. The spatial attributes include at least one of (i) residential areas, (ii) regions of interest, or (iii) place categories.

In yet another embodiment, the one or more data streams includes at least one of (i) non-location indexed traffic data, (ii) digital visit count to a global website, or (iii) social media activities.

In yet another embodiment, the method employs Lucene search techniques for profiling the entities. The Lucene search techniques match the one or more entity attribute document associated with the one or more entities with the collection of queries and return a true Boolean value for matching queries.

In yet another embodiment, the method further includes configuring a machine learning-based matching model on the profiler module for profiling real time entities. The machine learning-based matching model matches the one or more entity attribute document associated with the one or more entities with the collection of queries and return a true Boolean value for matching queries.

In yet another embodiment, the method further includes determining heterogeneity in the entity attributes using a proprietary language. The proprietary language is defined by (i) the entity attributes and (ii) values for each entity attribute.

In yet another embodiment, one or more data streams w includes at least one of (i) location pings from one or more application engaged on the one or more entity devices, (ii) access pings from wireless hot-spots, (iii) active subscriber's data & location in different geo-areas (GSM) from a mobile network, and (iv) local information from traffic sensors or a public CCTV camera for security and others.

In one aspect, one or more non-transitory computer-readable storage medium storing the one or more sequence of instructions, which when executed by a processor, performs real time cohort creation of entities based on entity attributes derived from partially observable location data by (i) obtaining, in real time, one or more data streams from one or more independently controlled data sources, wherein the one or more data streams include a unique entity identifier, entity attributes, time-stamp data, location indexed data and the one or more data streams partially characterizes an activity of an entity associated with the unique entity identifier; (ii) de-duplicating the one or more data streams associated with the entity from one or more independently controlled data sources by analyzing the entity attributes associated with the unique entity identifier; (iii) classifying a unified entity event from the one or more data streams along with dynamic entity attributes retrieved from a memory store, wherein the unified entity event includes values of the entity attributes; (iv) updating one or more entity attribute documents associated with one or more entities by storing the values of the entity attributes from the unified entity event temporally, wherein a new entity attribute document and a new unique entity identifier is created for a new entity in real-time; (v) reverse searching to match the one or more entity attribute documents associated with the one or more entities with a collection of queries for profiling each of the one or more entities, wherein the collection of queries includes cohort definition with at least one entity attributes specified in Boolean logic and the one or more entity attribute documents include all values of the entity attributes that have been captured historically; and (vi) generating, using a cohort creation module, entity cohorts with at least one cohort label based on matching between the one or more entity attribute document and the collection of queries, wherein the entity cohorts are identified based on a searched cohort definition.

In one aspect, a system for real time cohort creation based on entity attributes is provided. The system includes a device processor and a non-transitory computer readable storage medium storing one or more sequences of instructions, which when executed by the device processor, causes (i) a data aggregator module to obtain, in real time, one or more data streams from one or more independently controlled data sources, wherein the one or more data streams include a unique entity identifier, entity attributes, time-stamp data, location indexed data and the one or more data streams partially characterizes an activity of an entity associated with the unique entity identifier; (ii) an analysis module to de-duplicate the one or more data streams associated with the entity from one or more independently controlled data sources by analysing the entity attributes associated with the unique entity identifier; (iii) an event classifier module to classify a unified entity event from the one or more data streams along with dynamic entity attributes retrieved from a memory store, wherein the unified entity event includes values of the entity attributes; (iv) an attribute document generation module to update one or more entity attribute documents associated with one or more entities by storing the values of the entity attributes from the unified entity event temporally, wherein a new entity attribute document and a new unique entity identifier is created for a new entity in real-time; (v) a profiler module to reverse search, to match the one or more entity attribute documents associated with the one or more entities with a collection of queries for profiling each of the one or more entities, wherein the collection of queries includes cohort definition with at least one entity attributes specified in Boolean logic and the one or more entity attribute documents include all values of the entity attributes that have been captured historically; and (vi) a cohort creation module to generate entity cohorts with at least one cohort label based on matching between the one or more entity attribute document and the collection of queries, wherein the entity cohorts are identified based on a searched cohort definition.

In an embodiment, the one or more collection of rules is associated with the dynamic entity attributes and static entity attributes to account for scalability of new attributes that become available.

In yet another embodiment, the system enables integration of one or more distributed data sources and new events in real-time without interrupting the flow of the ongoing method. The profiling is performed selectively for the one or more entities whose values of entity attributes in their entity attribute document have changed above a predefined threshold.

In another embodiment, the entity attributes include at least one of a countable attribute, a categorical attribute, an ordinal, a location, a spatial, or a temporal behavior of an entity. The countable attribute includes at least one of (i) spend levels, or (ii) a frequency of visits. The categorical attribute includes at least one of (i) a gender, (ii) age-groups, (iii) a content, or (iv) a content type. The spatial attributes include at least one of (i) residential areas, (ii) regions of interest, or (iii) place categories.

In yet another embodiment, the one or more data streams includes at least one of (i) non-location indexed traffic data, (ii) digital visit count to a global website, or (iii) social media activities.

In yet another embodiment, the system employs Lucene search techniques for profiling the entities. The Lucene search techniques match the one or more entity attribute document associated with the one or more entities with the collection of queries and return a true Boolean value for matching queries.

In yet another embodiment, the system further configures a machine learning-based matching model on the profiler module for profiling real time entities. The machine learning-based matching model matches the one or more entity attribute document associated with the one or more entities with the collection of queries and return a true Boolean value for matching queries.

In yet another embodiment, the system determines heterogeneity in the entity attributes using a proprietary language. The proprietary language is defined by (i) the entity attributes (ii) values for each entity attribute.

In yet another embodiment, one or more data streams includes at least one of (i) location pings from one or more application engaged on the one or more entity devices, (ii) access pings from wireless hot-spots, (iii) active subscriber's data & location in different geo-areas (GSM) from a mobile network, and (iv) local information from traffic sensors or a public CCTV camera for security and others.

In yet another embodiment, the system includes a communication module that is configured to communicate a target media content to one or more entity devices associated with the identified entity cohort over a media vehicle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5A to FIG. 5F illustrate graphical representations of a user interface of the web-based cohort creation system according to some embodiments herein;

DETAILED DESCRIPTION OF PREFERRED EMBODIMENTS

Figure 1:
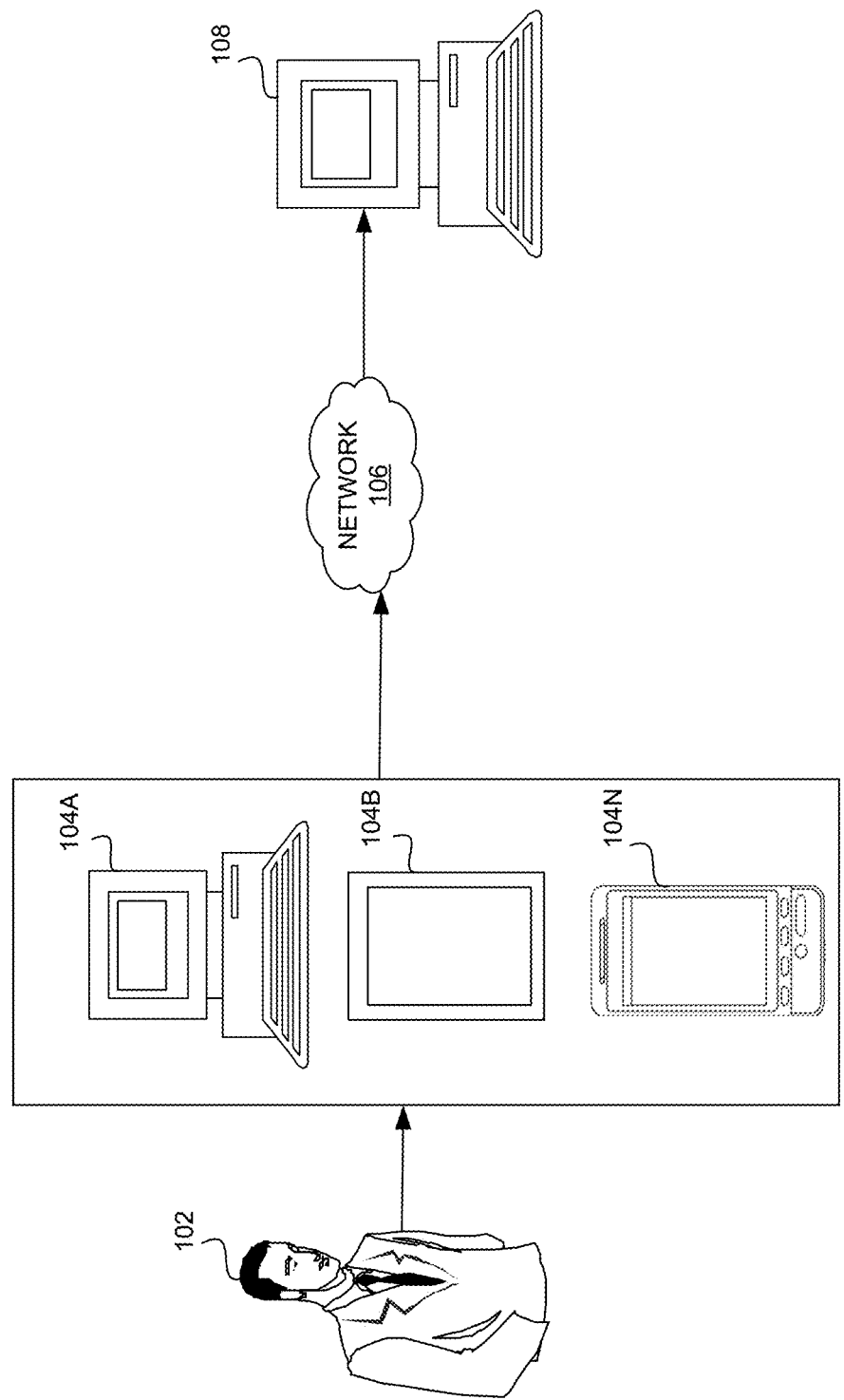
FIG. 1 is a system view that illustrates an interaction between one or more data sources and a cohort creation system for generation of cohorts of entities based on entity attributes according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for performing real-time spatio temporal cohort creation based on entity attributes derived from partially observable location data for communicating a target media content to an identified entity cohort. The embodiments herein achieve this by proposing a system that performs cohort creation of entities in real-time and in the future based on one or more data streams associated with one or more entity activity. Referring now to the drawings, and more particularly to FIGS. 1 to 7, where similar reference characters denote corresponding features consistently throughout the figures, there are shown preferred embodiments.

FIG. 1 is a system view that illustrates interaction between one or more data sources and a cohort creation system for the generation of cohorts of entities based on entity attributes according to some embodiments herein. The system includes one or more independently controlled data sources 104A-N associated with an entity 102, a network 106, and a cohort creation system 108. The entity 102 may be any person who needs to be included in a cohort for selected attributes. In one embodiment, the attributes include but not limited to a location, individual attributes, a time window per activity, or a combination thereof. In one embodiment, the individual attributes include a countable attribute, a categorical attribute, an ordinal, a location, a spatial, or a temporal behavior of an entity. The one or more data sources 104A-N and the cohort creation system 108 communicate through the network 106. In some embodiments, the network 106 is a wired network. In some embodiments, the network 106 is a wireless network. In some embodiments, the network 106 is a combination of a wired network and a wireless network. In some embodiments, the network 106 is the Internet. In one embodiment, the one or more independently controlled data sources 104A-N are but not limited to one or more entity devices. In one embodiment, the one or more entity devices are engaged with at least one of (i) one or more applications, (ii) a wireless network, or (iii) a mobile network. The term "independently controlled entity sources" refers to any source that may control or standardize different aspects of data streams. The different aspects include but not limited to 1) What data can be collected?, 2) When and where the data is collected?, 3) How the data is collected?, 4) How collected data can be modified?, 5) What data is public, 6) What data is protected?, 7) What data can be permitted by a consumer/user of the application/device?, and 8) What data is completely private?

The term "partially observable data" refers to a data stream where all the events are not captured due to several reasons.

The term "one or more streams from independently controlled sources" refers to data stream from independently controlled sources. For example, consider a consumer using multiple applications on his android phone, as he/she interacts with each application, multiple independent streams of events are produced since, each application being an independent source. Events and users may have different identifiers across different applications depending on how it is implemented. Additionally, if one were to monitor the network, each application level event may generate additional lower level network events.

The cohort creation system 108 obtains, in real-time, the one or more data streams from one or more independently controlled data sources. The one or more data streams include a unique entity identifier, entity attributes, time-stamp data, location indexed data. The one or more data streams partially characterize an activity of an entity associated with the unique entity identifier. In one embodiment, the one or more data streams includes at least one of (i) location pings from one or more application engaged on the one or more entity devices, (ii) access pings from wireless hot-spots, (iii) active subscriber's data & location in different geo-areas (GSM) from the mobile network, and (iv) local information from traffic sensors or a public CCTV camera for security and others.

The cohort creation system 108 de-duplicates the one or more data streams associated with the entity from one or more independently controlled data sources 104A-N by analyzing entity attributes associated with the unique entity identifier.

The cohort creation system 108 classifies a unified entity event from the one or more data streams along with dynamic entity attributes retrieved from a memory store. In an embodiment, the unified entity event includes the values of the entity attributes.

The cohort creation system 108 updates one or more entity attribute documents associated with one or more entities by storing the values of the entity attributes from the unified entity event. In an embodiment, a new entity attribute document and a new unique entity identifier is created for the entity in real-time when the entity is new. In an embodiment, the entity attribute document includes all values of the entity attributes that have been captured historically.

The cohort creation system 108 reverse searches to match the one or more entity attribute documents associated with the one or more entities with a collection of queries for profiling each of the one or more entities. In an embodiment, the collection of queries includes cohort definition with at least one entity attributes specified in Boolean logic. In an embodiment, the collection of queries is segmentation rules. In an embodiment, the segmentation rules are stored in a segmentation rules database.

The cohort creation system 108 provides cohort labels to the matched entity attribute documents. The cohort creation system 108 generates entity cohorts with at least one cohort label based on the matched entity attribute document of the entities. In one embodiment, the entity cohorts are identified based on a searched cohort definition.

In one embodiment, the cohort creation system 108 is configured with a machine learning-based matching model for profiling the entities in real-time. The machine learning model employs a Lucene search technique for profiling the entities match the one or more entity attribute document associated with the one or more entities with the collection of queries and return a true Boolean value for matching queries.

In one embodiment, the cohort creation system 108 returns a true Boolean value for matching queries when one or more queries match with the entity attributes.

In one embodiment, a new entity attribute document is created for the entity in real-time for a new entity by checking if each ping is associated with the unique entity identifier.

In one embodiment, the one or more queries are one or more collection of rules. The one or more collection of rules is associated with the dynamic entity attributes and static entity attributes.

In one embodiment, the profiling is done selectively for the entities whose values of entity attributes in their entity attribute document have changed above a predefined threshold. In an exemplary embodiment, if distance from the current location of an entity and the home location of the entity attribute says 50 meters and the predefined threshold of the distance from the current location of the entity and the home location of the entity is 40 meters, then the entity is selected for profiling, as the value of the distance from the current location of the entity and home location of the entity attribute is more than the predefined threshold. In another exemplary embodiment, if the annual income attribute of an entity says $5000 and the predefined threshold is $6000, then the entity is not selected for profiling as the value of the annual income attribute is less than the predefined threshold.

In one embodiment, the cohort creation system 108 enables integration of one or more distributed data sources and new events in real-time without interrupting the flow of the ongoing method.

In one embodiment, the collection of rules is associated with dynamic entity attributes and static entity attributes. The collection of rules is scalable to account for new attributes that become available.

In an embodiment, the one or more data streams further includes at least one of (i) non-location indexed traffic data, (ii) digital visit count to global website, or (iii) social media activities.

In an embodiment, the countable attribute includes at least one of (i) spend levels, or (ii) frequency of visits.

In an embodiment, the spatial attribute includes at least one of (i) residential areas, or (ii) regions of interest, or (iii) place categories.

In an embodiment, the categorical attribute includes at least one of (i) a gender, (ii) age-groups, (iii) a content or (iv) a content type.

In one embodiment, the cohort creation system 108 determines heterogeneity in the entity attributes using a proprietary language, and the proprietary language is defined by (i) the entity attributes (ii) the values for each entity attribute.

Figure 2:
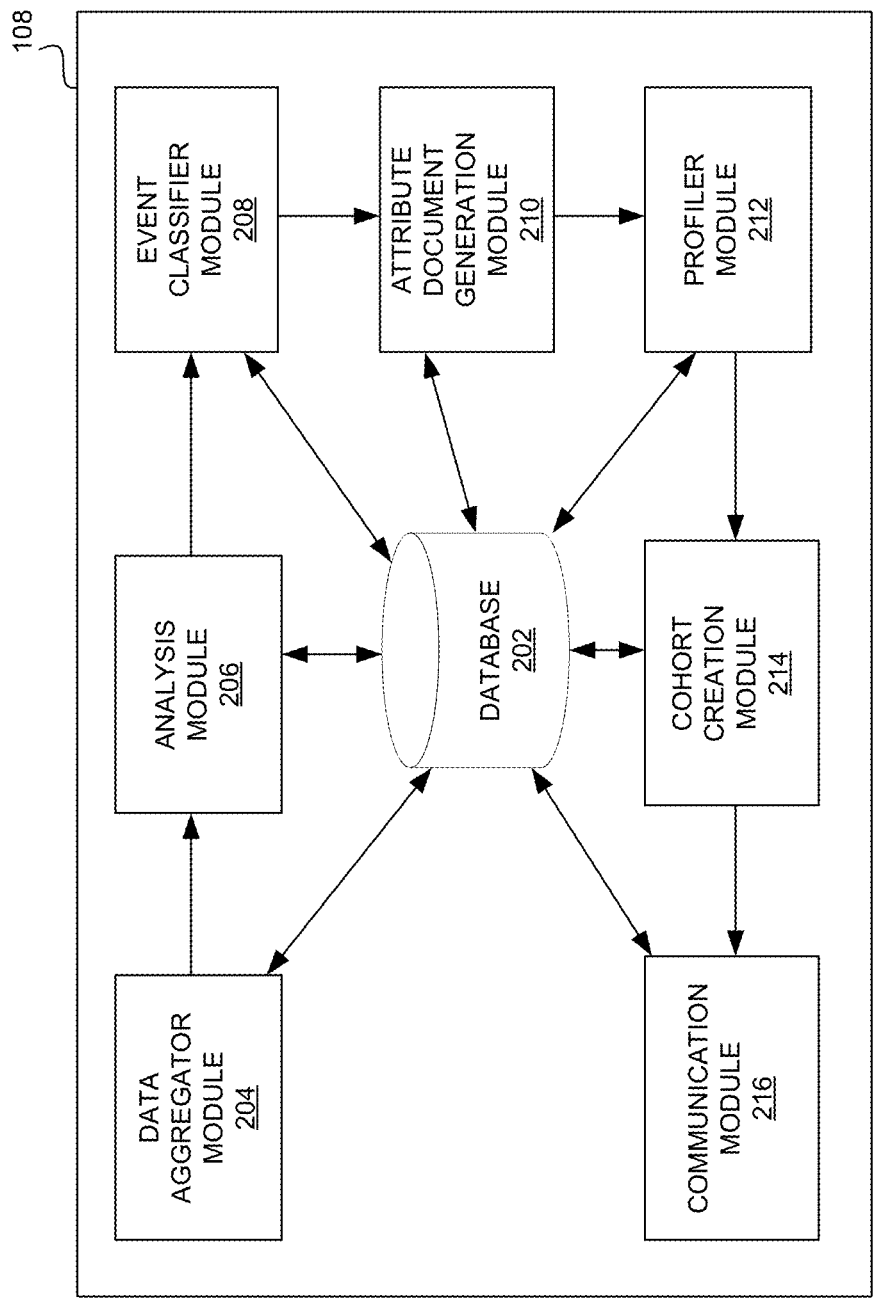
FIG. 2 illustrates an exploded view of the cohort creation system of FIG. 1 according to some embodiments herein.

FIG. 2 illustrates an exploded view of the cohort creation system 108 of FIG. 1 according to some embodiments herein. The cohort creation system 108 performs real-time cohort creation of entity-based on entity data which are attributes of an individual entity. The cohort creation system 108 includes a database 202, a data aggregator module 204, an analysis module 206, an event classifier module 208, an attribute document generation module 210, a profiler module 212, a cohort creation module 214 and a communication module 216. The data aggregator 204 obtains, in real-time, one or more data streams from one or more independently controlled data sources 104A-N. In one embodiment, the one or more data streams include a unique entity identifier, entity attributes, time-stamp data, location indexed data. The one or more data streams partially characterize an activity of an entity associated with the unique entity identifier. In one embodiment, the one or more data streams include at least one ping from one or more data sources. In one embodiment, the one or more independently controlled data sources 104A-N includes one or more entity devices. In another embodiment, the one or more entity devices are engaged with at least one of (i) one or more applications, (ii) a wireless network, or (iii) a mobile network. In one embodiment, the data aggregator 202 captures one or more data streams in real time over the network 106. In one embodiment, the network 106 includes a wireless network or a wired network. In one embodiment, the one or more entity devices include but not limited to a mobile device, a smart phone, a personal digital assistant (PDA), notebook, a Global Positioning System (GPS) device, or any network enabled device.

The analysis module 206 de-duplicates the one or more data streams associated with the entity from one or more independently controlled data sources 104A-N by analyzing entity attributes associated with the unique entity identifier. In one embodiment, the entity attributes include a countable attribute, a categorical attribute, an ordinal, a location, a spatial, or a temporal behavior of an entity. In an embodiment, the spatial attribute includes at least one of (i) residential areas, or (ii) regions of interest, or (iii) place categories. The event classifier module 208 classifies a unified entity event from the one or more data streams along with dynamic entity attributes retrieved from the database 202. In an embodiment, the unified entity event includes the values of the entity attributes. In an embodiment, a count of data events per use is stored in the database 202 which is dynamically managed to improve the performance of the event classifier module 208. In an embodiment, the event classifier module 208 combines the unified entity event and the values of the entity attributes to classify the unified entity event from the one or more data streams. The database 202 stores the values of the entity attributes from the unified entity event in an entity attribute document associated with the entity.

The attribute document generation module 210 updates one or more entity attribute document associated with one or more entities by storing the values of the entity attributes from the unified entity event. In one embodiment, a new entity attribute document and a new unique entity identifier is created for the entity in real-time when the entity is new. In one embodiment, the entity attribute document includes all values of the entity attributes that have been captured historically. In an embodiment, the unified entity event is partitioned with time and location. In an embodiment, the event classifier module 208 is configured with a machine learning model. In an embodiment, the event classifier module 208 performances are tuned with the machine learning model that stores per use the counts of events received so far and dynamically manages the database 202. The database statistics may also be used to appropriately route the unified entity event to an appropriate profiler downstream based on the incoming load by time and location. In one embodiment, the machine learning-based event classifier module 208 built on the statistics that are used to route unified entity events.

The profiler module 212 reverse searches to match the one or more entity attribute documents associated with the one or more entities with a collection of queries for profiling each of the one or more entities. In one embodiment, the collection of queries includes the cohort definition with at least one entity attributes specified in Boolean logic. In an embodiment, query match statistics is maintained dynamically by the profiler module 212 to manage the profiler behavior. In an embodiment, the collection of queries which are old or stale may be offloaded and retrieved from the distributed memory store or a cache when the first unified entity event is received. In one embodiment, the profiler module 212 generates additional sub-processes of the reverse search based on the load of the unified entity events partitioned by time and location. In one embodiment, the event classifier module 208 based on query statistics are used to manage the load balancing dynamically. In an embodiment, the profiling is done selectively for the entities whose values of entity attributes in their entity attribute document have changed above a predefined threshold. In another embodiment, the profiler module 212 returns a true Boolean value for matching queries when one or more queries match with the entity attributes.

The cohort creation module 214 generates entity cohorts with at least one cohort label based on the matched entity attribute document of the entities. In one embodiment, the entity cohorts are identified based on a searched cohort definition.

The communication module 216 communicates a target media content to one or more entity devices associated with the identified entity cohort over a media vehicle.

In one exemplary embodiment, the unique entity identifier is globally unique for a single entity (even the single entity owns multiple devices) which is generated on the fly before reaching the data aggregator 204. In one exemplary embodiment, the cohort creation system 108 is communicatively connected with a system that is capable of linking one or more entity identifiers to generate the unique entity identifier using a clustering device, a disambiguator and a validator.

In an embodiment, the cohort creation system 108 may optionally include a clustering device, a disambiguator and a validator. The clustering device receives the one or more data streams and clusters the one or more entity devices by identifying entity devices having an association with each other with respect to at least one of an internet protocol (IP) address, a real-time event, a period of time or a location. The disambiguator analyses the clusters obtained from the clustering device and identifies sub-clusters that resolve to a single entity. The validator validates the single entity owns all the devices that exist in the sub-cluster against entity behavioral attributes and generates a unique entity identifier which corresponds to the single entity. In an embodiment, the unique entity identifier is also mapped to a home location of the single entity which enables the persistence of the unique entity identifier compared to traditional anonymized identifiers.

In an exemplary embodiment, John owns five devices. The incoming data streams from the five devices of John include five identifiers namely C1, C2, P1, P2, and T1 along with other payload information. The clustering device clusters the five identifiers namely C1, C2, P1, P2, and T1 based on at least one of the internet protocol (IP) address, real-time event, a period of time or a location. The disambiguator links these five identifiers and maps the unique user identifier "9517ANR". Further, the disambiguator discerns patterns of identifiers that appear to always be" on the move" together and validates behavior signals from various identifiers in order to generate the unique entity identifier "9517ANR". The behavioral attributes that are associated with all the individual identifiers may include male, 26-35, business professional, fitness freak, affluent, gamer, loves soccer and/or tennis. The disambiguator analyses the available clusters and starts to disambiguate or discern patterns of identifiers that are observed to always be together in spatio-temporal occurrences.

In an exemplary embodiment, a unique entity identifier "1001" has categorical attributes known to be a male, has a mobile identifier "**1001_*m*" and has a plurality of cookie identifiers namely "1001_*c*_1", "1001_*c*_2", "1001_*c*_3" associated with it. A validator optionally embedded in the entity estimation system 106 validates which cookies truly map to this mobile identifier "1001_*m*". The above set of identifiers is generated from 3 candidate pairs which are a union of (1001_*m*,1001_*c*_1), (1001_*m*, 1001_*c*_2) and (1001_*m*, 1001_*c*_3). The validator runs an engagement activity that targets a male segment for which the unique entity identifier "1001" is a member of. Further, the validator runs an engagement activity on mobile device identifiers which include targeting the unique entity identifier 1001_*m* and also a cookie engagement activity consisting of all the cookies that are linked with the unique entity identifier "1001". The validator validates if engagement is received for both the mobile identifier "1001_*m***" and set of cookies identifiers, it is validated that they both refer to the same individual.

In an exemplary embodiment, the event classifier module 206, and the profiler module 208 described herein and illustrated in the figure are embodied as hardware and may be configured as electronic circuits, devices, digital chip, and discrete elements packaged onto a circuit board to provide data and signal processing functionality within a computer for performing various functionalities and accounting scalability.

Figures 3A, 3B:
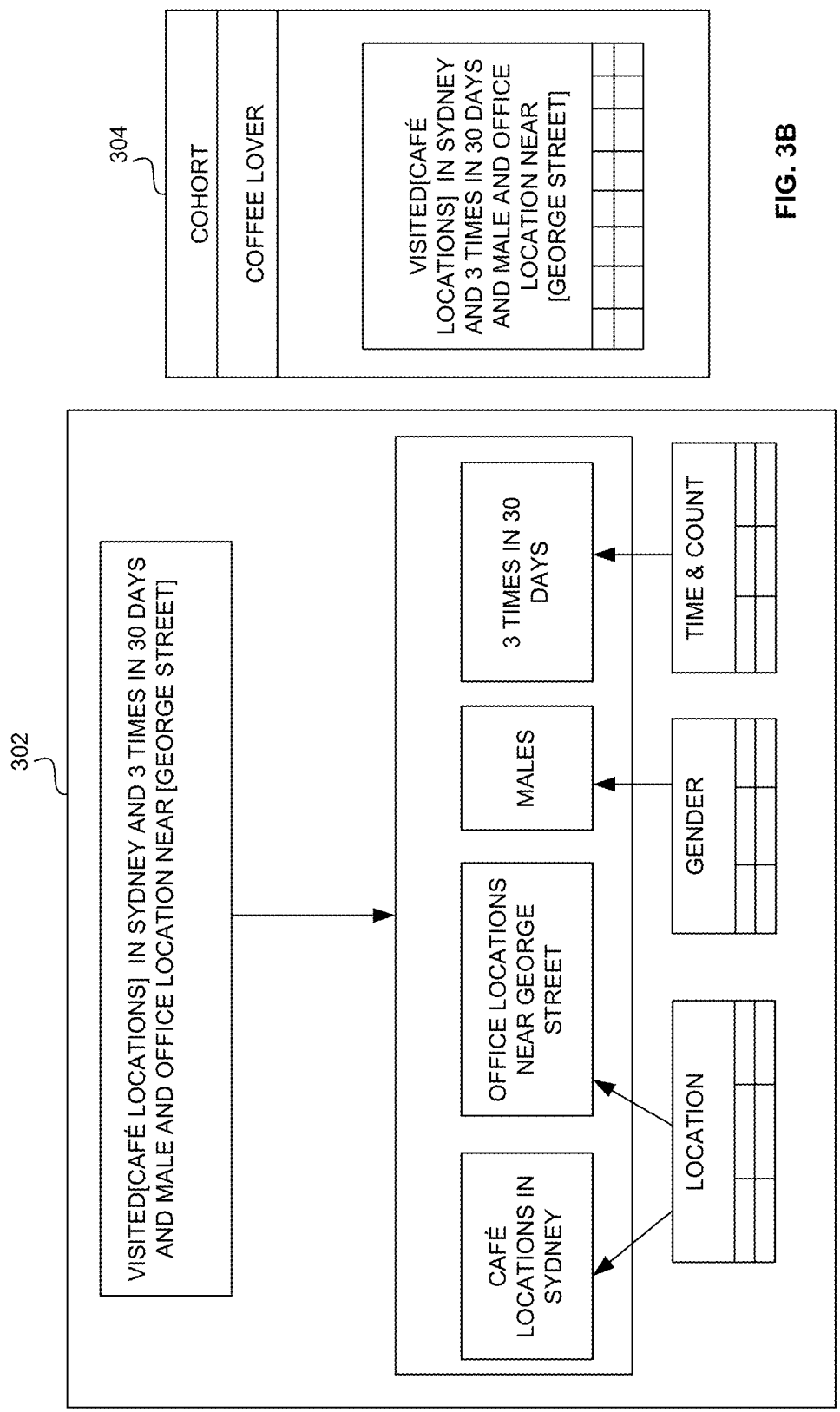
FIG. 3A illustrates an exemplary representation of dynamic attributes in a distributed memory and FIG. 3B illustrates an exemplary representation of an entity cohort according to some embodiments herein.

FIG. 3A illustrates an exemplary representation of dynamic attributes in a distributed memory and FIG. 3B illustrates an exemplary representation of the entity cohort according to some embodiments herein. In FIG. 3A, for example, a cohort, "coffee lovers", which is defined as a collection of queries, for example, "the cafe locations in Sydney visited for 3 times in 30 days by the male entities whose office location is near George Street". The one or more entity attribute documents associated with the one or more entities are matched with the above defined collection of queries through reverse searching. From the "Gender" data table, the number of male entities who have visited the café is retrieved. From the "Location" data table, the cafe locations in Sydney and the location near the male entity's office locations (e.g. George Street) are retrieved. From the "Time and Count" data table, the duration (e.g. 30 days) and frequency of cafe visits (e.g. 3 times) are retrieved. The values of the entity attributes in the distributed memory 302 are retrieved pertaining to the defined entity event under a cohort label named "Coffee Lovers" based on the matching between the one or more entity attribute documents of the one or more entities and the collection of queries. FIG. 3B represents a cohort label named "Coffee Lovers" 304, which includes the values of the entity attributes pertaining to the above entity event.

Figure 4:
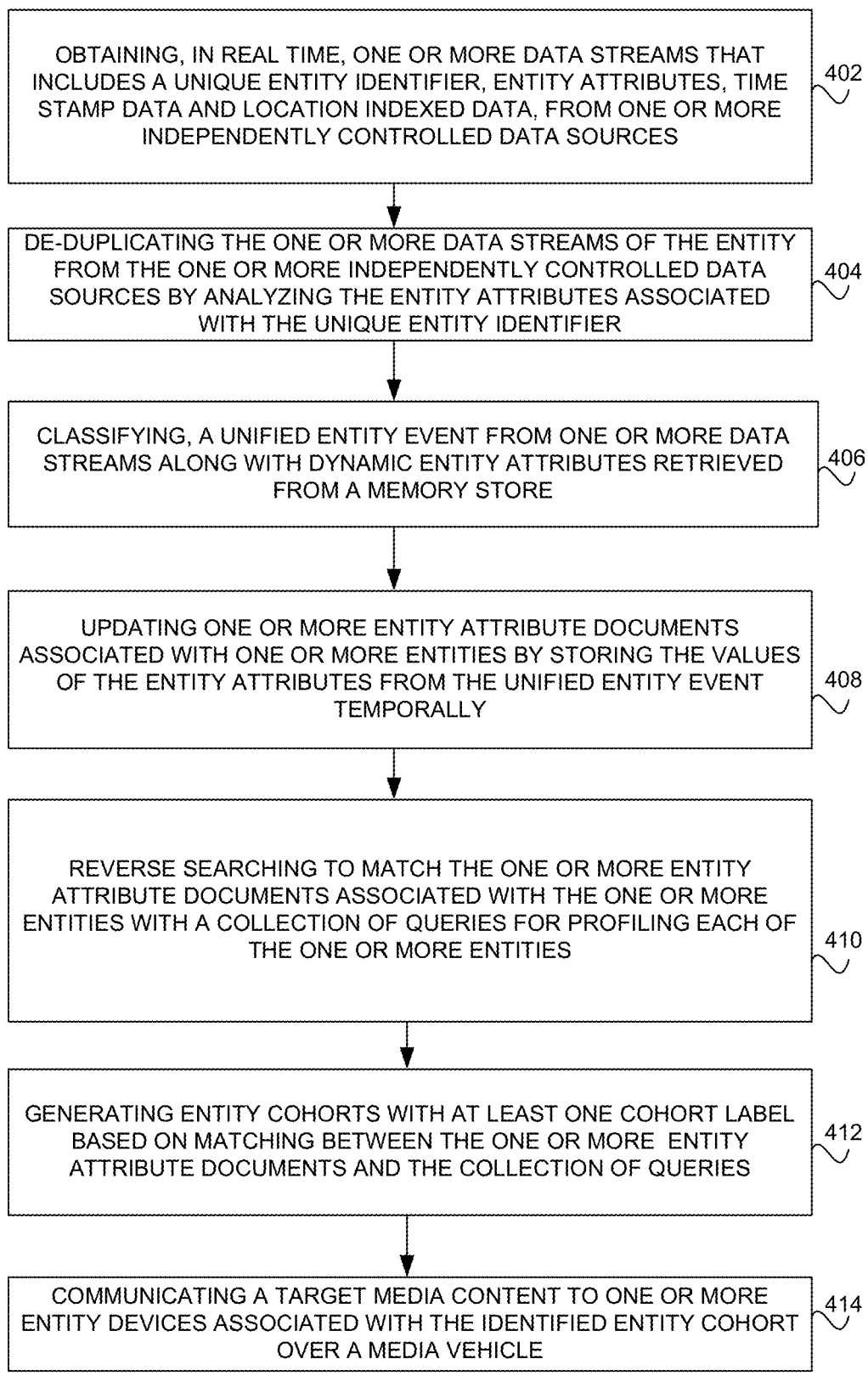
FIG. 4 is a flow diagram that illustrates a method of real-time cohort creation of entities based on entity attributes according to some embodiments herein.

FIG. 4 is a flow diagram that illustrates a method of real-time cohort creation of entities based on entity attributes according to some embodiments herein. At step 402, one or more data streams from one or more independently controlled data sources is obtained. In an embodiment, the one or more data streams include a unique entity identifier, entity attributes, time-stamp data, and location indexed data. In an embodiment, the one or more data streams partially characterize an activity of an entity associated with the unique entity identifier. At step 404, the one or more data streams of the entity from the one or more independently controlled data sources is de-duplicated by analyzing the entity attributes associated with the unique entity identifier. At step 406, a unified entity event from one or more data streams is classified along with dynamic entity attributes retrieved from a memory store. In an embodiment, the unified entity event includes values of the entity attributes. At step 408, one or more entity attribute documents associated with the one or more entities are updated by storing the values of the entity attributes from the unified entity event temporally. In an embodiment, a new entity attribute document and a new unique entity identifier is created for a new entity in real-time. At step 410, the one or more entity attribute documents associated with the one or more entities is matched with a collection of queries for profiling each of the one or more entities. In an embodiment, the collection of queries includes cohort definition. The cohort definition includes at least one entity attributes specified in Boolean logic. In an embodiment, the entity attribute document includes all values of the entity attributes that have been captured historically is reverse searched. At step 412, entity cohorts are generated with at least one cohort label based on matching between the one or more entity attribute documents and the collection of queries. In an embodiment, the entity cohorts are identified based on a searched cohort definition. At 414, a target media content to one or more entity devices associated with the identified entity cohort is communicated over a media vehicle.

Figure 5B:
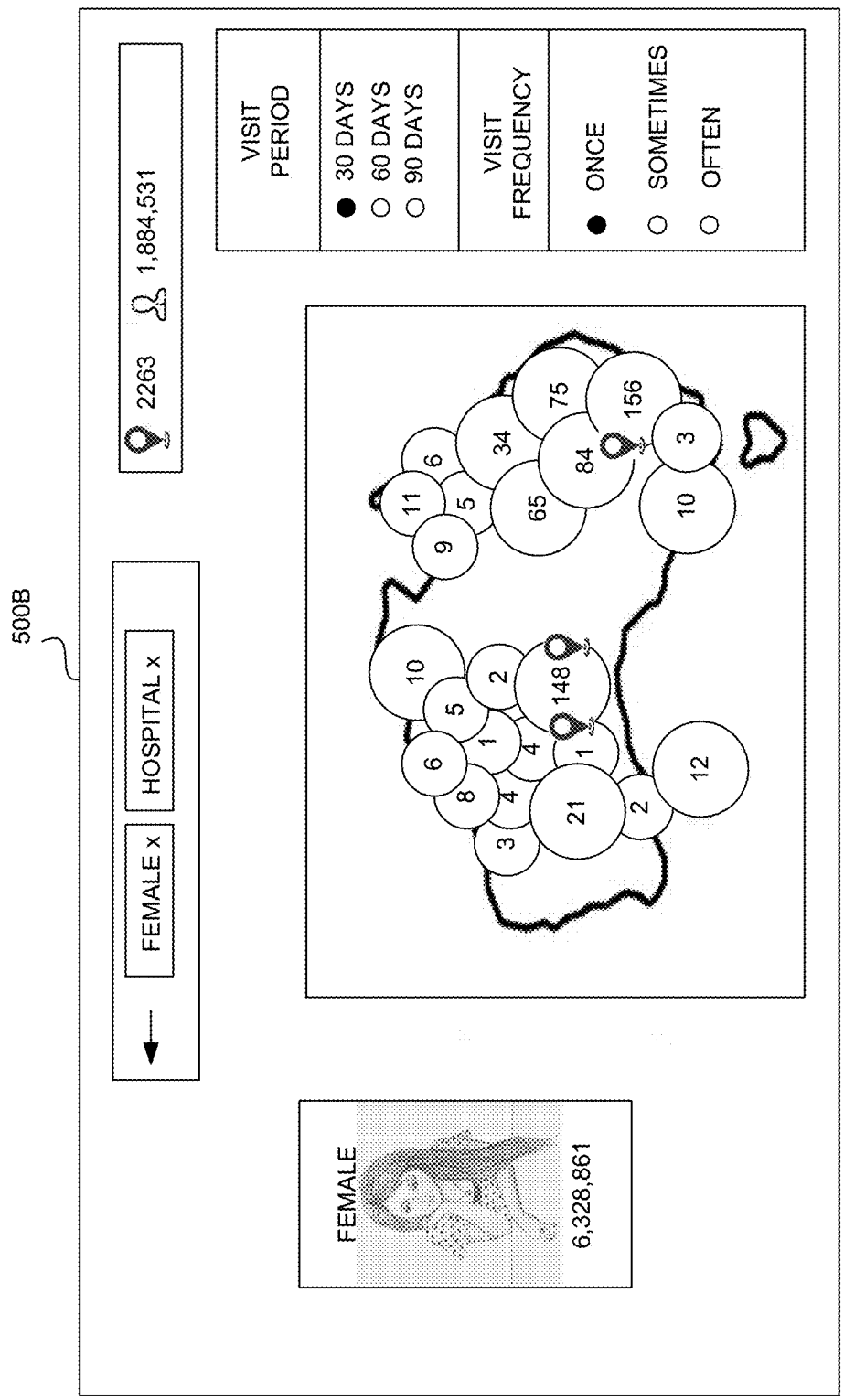
Figure 5C:
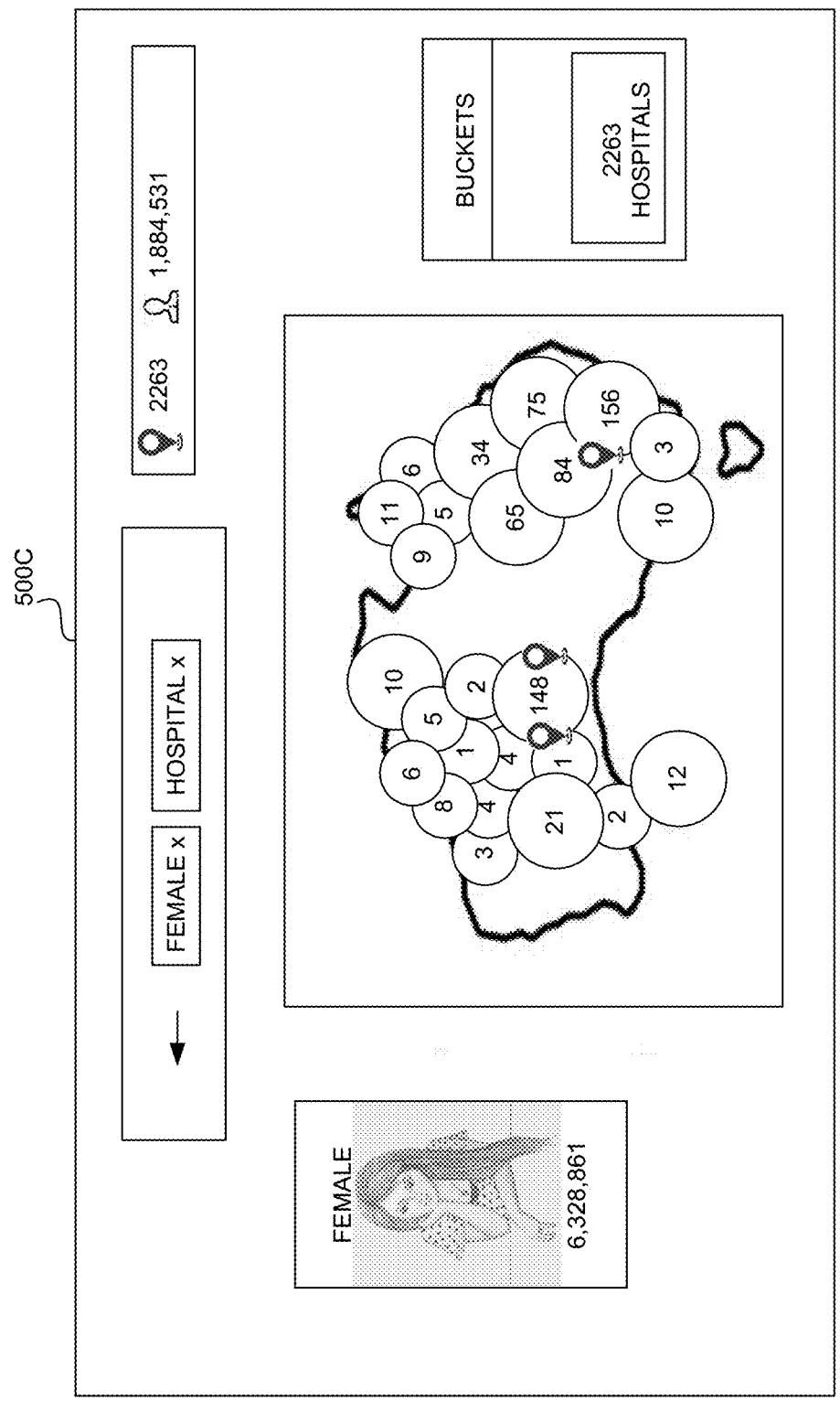
Figure 5D:
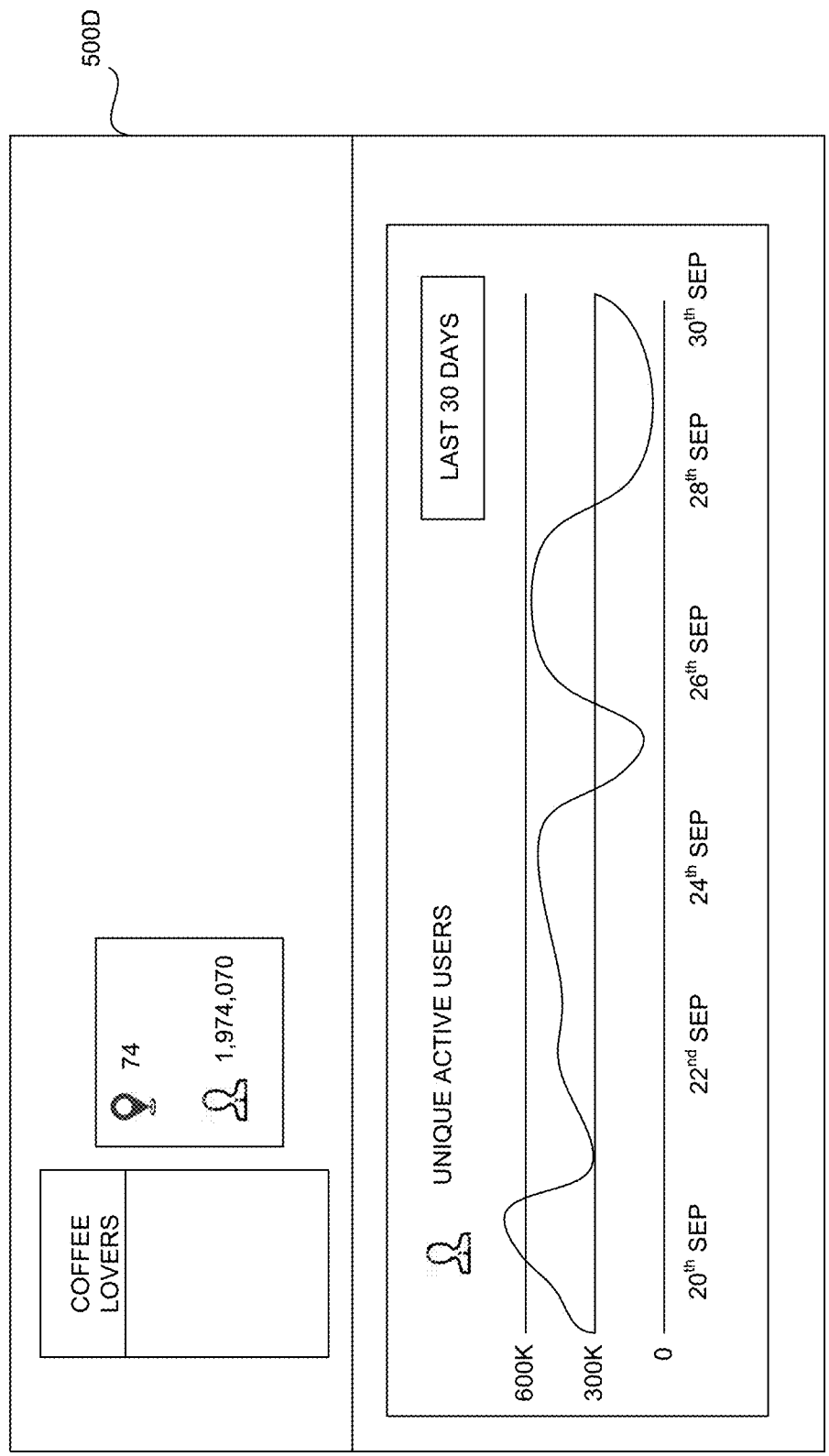
Figure 5E:
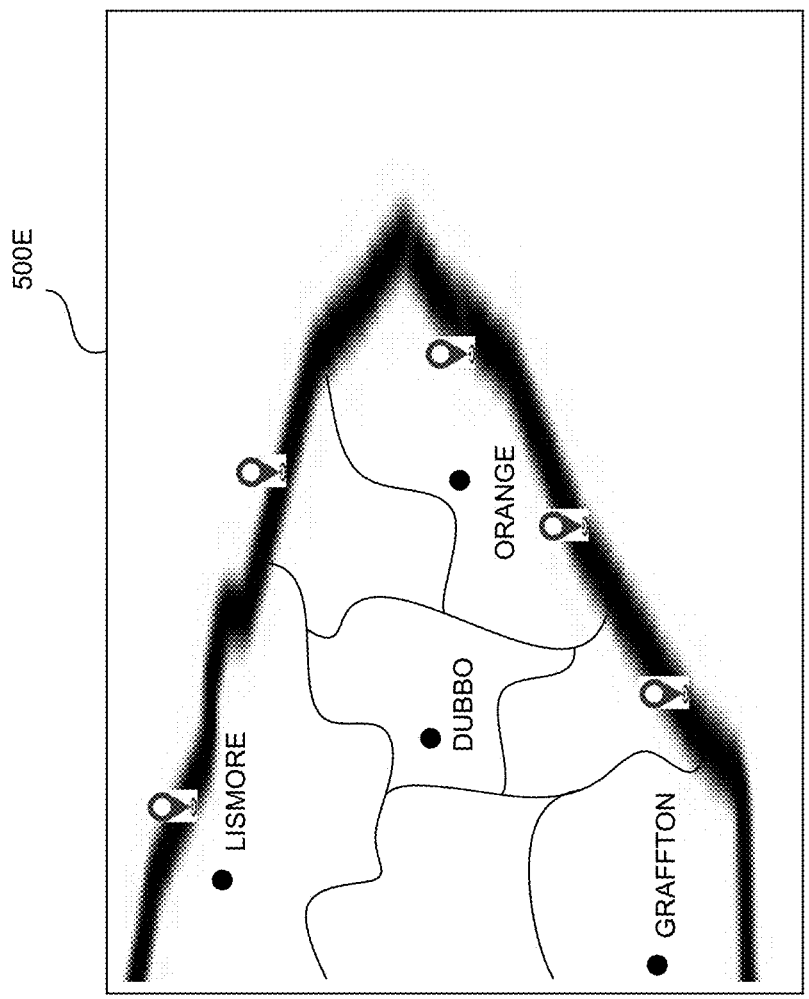
Figure 5F:
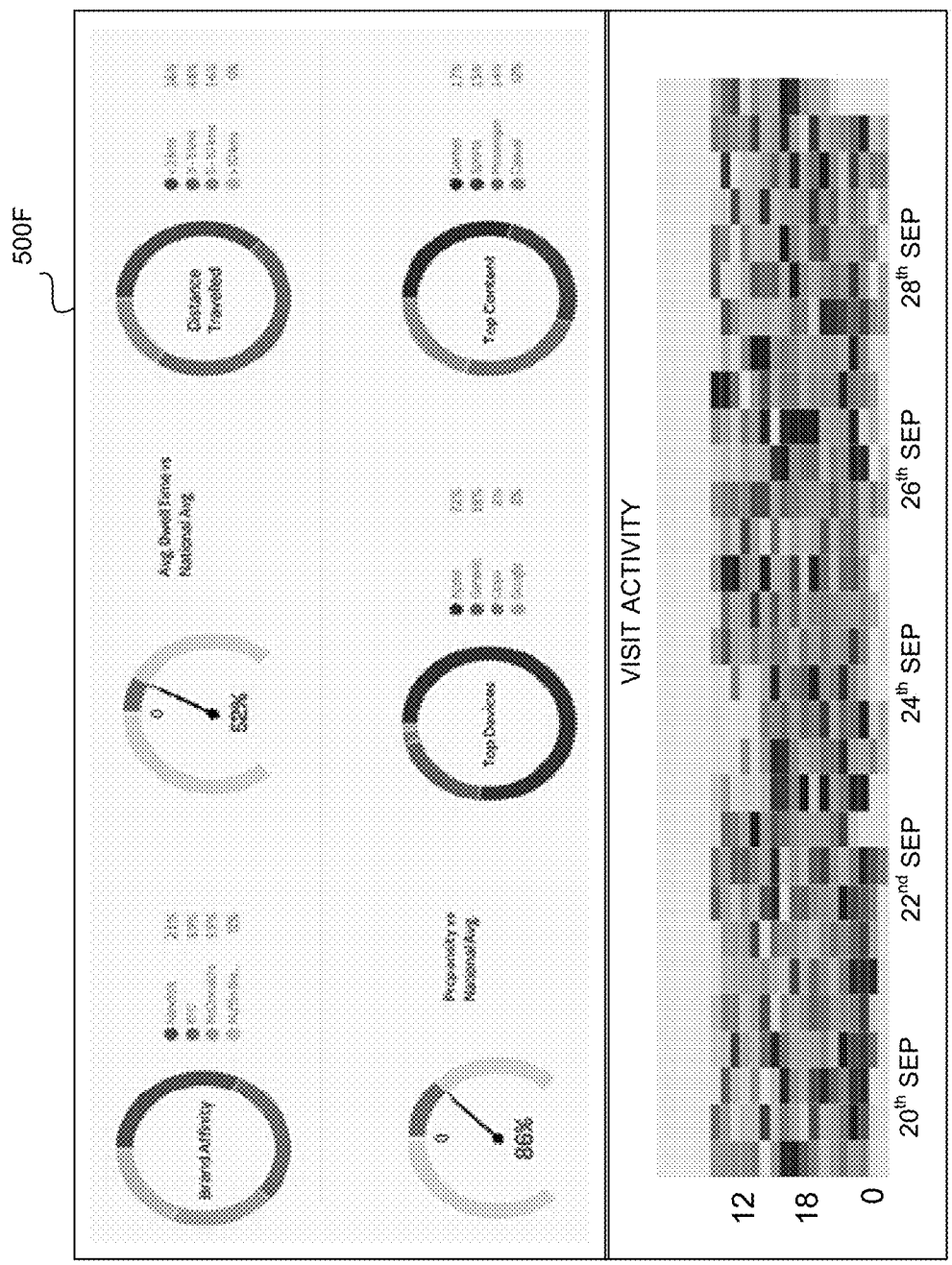

FIGS. 5A to 5F illustrate graphical representations of a user interface of web-based cohort creation system 108 according to some embodiments herein. FIG. 5A illustrates a search page 500A that allows a user to search the web-based cohort creation system 108 by providing a query. FIG. 5B illustrates a result page 500B that includes search results for the query provided by the user. In one embodiment, the user interface view of result page 500B allows the entity to provide additional selection criteria to the search result. Also, the result page 500B includes a count of the entity as per attributes based on the search query like a count of gender, a count of spatial location, a count of visits and so on. FIG. 5C illustrates a result page 500C of entity cohorts related to the search query. FIG. 5D illustrates a graphical representation of an entity cohort 500D for the search query. FIG. 5E illustrates a graphical representation of an entity cohort 500E over a spatial location. FIG. 5F illustrates a graphical representation of an entity cohort 500F with visit activities of different on a particular point of interest.

Figure 6:
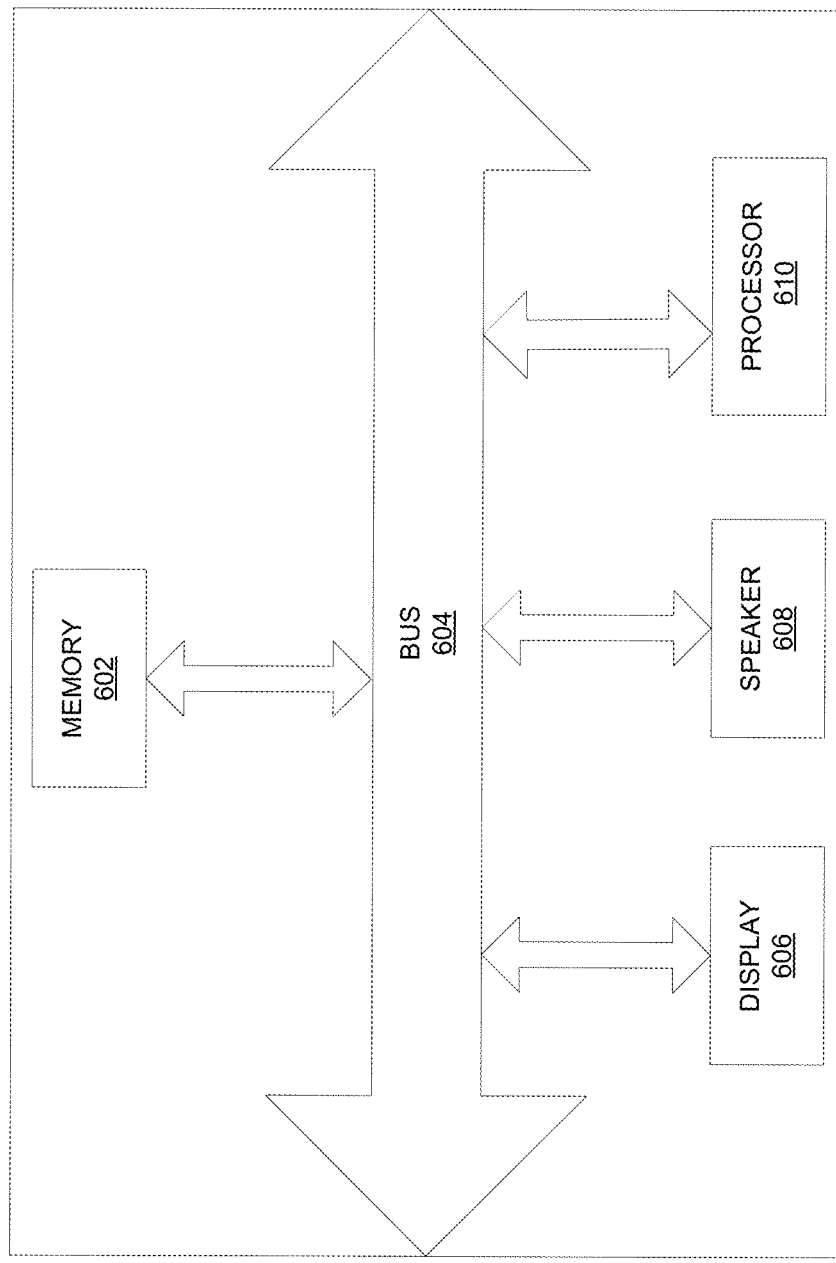
FIG. 6 illustrates an exploded view of a computing device according to some embodiments herein.

FIG. 6 illustrates an exploded view of the computing device/cohort creation system 108 of FIG. 1 according to the embodiments herein. The computing device having a memory 602 having a set of computer instructions, a bus 604, a display 606, a speaker 608, and a processor 610 capable of processing a set of instructions to perform any one or more of the methodologies herein, according to an embodiment herein. The processor 610 may also enable digital content to be consumed in the form of a video for output via one or more displays 606 or audio for output via speaker and/or earphones 608. The processor 610 may also carry out the methods described herein and in accordance with the embodiments herein.

The embodiments herein can take the form of, an entirely hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 7:
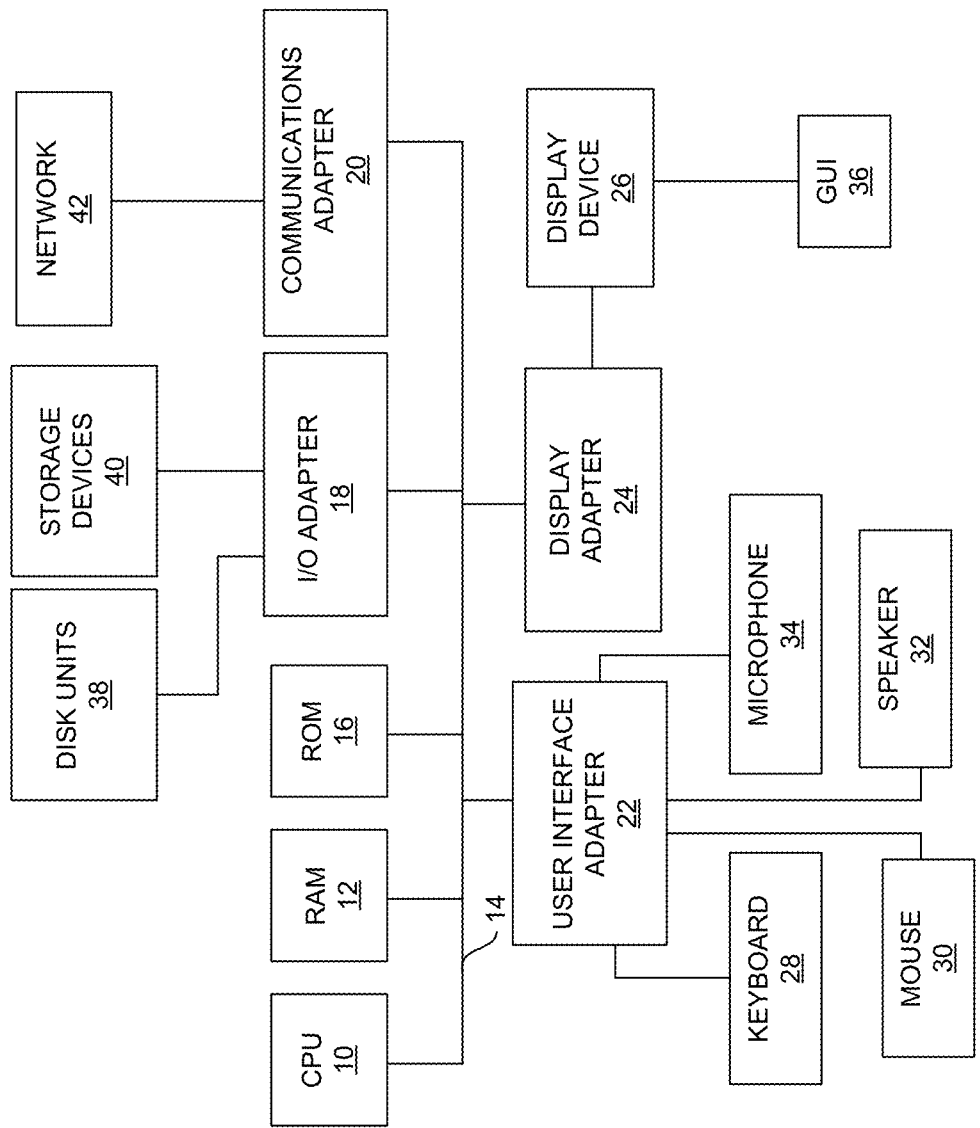
FIG. 7 is a schematic diagram of a computer architecture in accordance with the embodiments herein.

A representative hardware environment for practicing the embodiments herein is depicted in FIG. 7, with reference to FIGS. 1 through 6. This schematic drawing illustrates a hardware configuration of a server/computer system/computing device/the cohort creation system 108 in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes an entity interface adapter 22 that connects a keyboard 28, mouse 30, speaker 32, microphone 34, and/or other entity interface devices such as a touch screen device (not shown) to the bus 14 to gather entity input. Additionally, a communication adapter 20 connects the bus 14 to a data processing network 42, and a display adapter 24 connects the bus 14 to a display device 26, which provides a graphical entity interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A method of real time cohort creation of entities based on entity attributes derived from partially observable location data, the method comprising:
    obtaining, in real time, a plurality of data streams from a plurality of independently controlled data sources, wherein the plurality of data streams comprises a unique entity identifier, entity attributes, time-stamp data, location indexed data and the plurality of data streams characterizes at least one attribute of an activity of an entity associated with the unique entity identifier;
    de-duplicating the plurality of data streams associated with the entity from the plurality of independently controlled data sources by analyzing the entity attributes associated with the unique entity identifier;
    classifying a unified entity event from the plurality of data streams along with dynamic entity attributes retrieved from a memory store, wherein the unified entity event comprises values of the entity attributes;
    updating a plurality of entity attribute documents associated with a plurality of entities by storing the values of the entity attributes from the unified entity event temporally, wherein a new entity attribute document and a new unique entity identifier is created for a new entity in real-time;
    reverse searching to match the plurality of entity attribute documents associated with the plurality of entities with a collection of queries for profiling each of the plurality of entities, wherein the collection of queries comprises cohort definition with at least one entity attributes specified in Boolean logic, wherein the plurality of entity attribute documents comprise all values of the entity attributes that have been captured historically; and
    generating, using a cohort creation module, entity cohorts with at least one cohort label based on the matching between the plurality of entity attribute documents and the collection of queries, wherein the entity cohorts are identified based on a searched cohort definition.

2. The method as claimed in claim 1, wherein the collection of queries is associated with the dynamic entity attributes and static entity attributes to account for scalability of new attributes that become available.

3. The method as claimed in claim 1, wherein the method enables integration of a plurality of distributed data sources and new events in real-time without interrupting the flow of the ongoing method, wherein the profiling is performed selectively for the plurality of entities whose values of entity attributes in their entity attribute document have changed above a predefined threshold.

4. The method as claimed in claim 1, wherein the entity attributes comprise at least one of a countable attribute, a categorical attribute, an ordinal, a location, a spatial, or a temporal behavior of an entity, wherein:
    the countable attribute comprises at least one of (i) spend levels, or (ii) a frequency of visits;

the categorical attribute comprises at least one of (i) a gender, (ii) age-groups, (iii) a content, or (iv) a content type; and the spatial attribute comprises at least one of (i) residential areas, (ii) regions of interest, or (iii) place categories.

5. The method as claimed in claim 1, wherein the plurality of data streams comprises at least one of (i) non location indexed traffic data, (ii) a digital visit count to global website, or (iii) social media activities.

6. The method as claimed in claim 1, wherein the method employs Lucene search techniques for profiling the entities, wherein the Lucene search techniques match the plurality of entity attribute documents associated with the plurality of entities with the collection of queries and returns a true Boolean value for matching queries.

7. The method as claimed in claim 1, wherein the method comprises configuring a machine learning based matching model on the profiler module for profiling real time entities, wherein the machine learning based matching model matches the plurality of entity attribute documents associated with the plurality of entities with a collection of queries and returns a true Boolean value for matching queries.

8. The method as claimed in claim 1, wherein the method comprises determining heterogeneity in the entity attributes using a proprietary language, wherein the proprietary language is defined by (i) the entity attributes and (ii) the values for each entity attribute.

9. The method as claimed in claim 1, wherein the plurality of data streams comprises at least one of (i) location pings from one or more application engaged on the one or more entity devices, (ii) access pings from wireless hot-spots, (iii) active subscriber's data & location in different geo-areas (GSM) from a mobile network, and (iv) local information from traffic sensors or a public CCTV camera for security and others.

10. One or more non-transitory computer-readable storage medium storing the one or more sequence of instructions for providing a real time cohort creation of entities based on entity attributes derived from partially observable location data, which when executed by a processor cause:

obtaining, in real time, a plurality of data streams from a plurality of independently controlled data sources, wherein the plurality of data streams comprises a unique entity identifier, entity attributes, time-stamp data, location indexed data and the plurality of data streams characterizes at least one attribute of an activity of an entity associated with the unique entity identifier;

de-duplicating the plurality of data streams associated with the entity from the plurality of independently controlled data sources by analyzing the entity attributes associated with the unique entity identifier;

classifying a unified entity event from the plurality of data streams along with dynamic entity attributes retrieved from a memory store, wherein the unified entity event comprises values of the entity attributes;

updating a plurality of entity attribute documents associated with a plurality of entities by storing the values of the entity attributes from the unified entity event temporally, wherein a new entity attribute document and a new unique entity identifier is created for a new entity in real-time;

reverse searching to match the plurality of entity attribute documents associated with the plurality of entities with a collection of queries for profiling each of the plurality of entities, wherein the collection of queries comprises cohort definition with at least one entity attributes specified in Boolean logic, wherein the plurality of entity attribute documents comprise all values of the entity attributes that have been captured historically; and generating, using a cohort creation module, entity cohorts with at least one cohort label based on the matching between the plurality of entity attribute documents and the collection of queries, wherein the entity cohorts are identified based on a searched cohort definition.

11. A system for real time cohort creation based on entity attributes comprising:

a device processor; and a non-transitory computer-readable storage medium storing one or more sequences of instructions, which when executed by the device processor, causes:

a data aggregator module to obtain in real time, a plurality of data streams from a plurality of independently controlled data sources, wherein the plurality of data streams comprises a unique entity identifier, entity attributes, time-stamp data, location indexed data and the plurality of data streams characterizes at least one attribute of an activity of an entity associated with the unique entity identifier;

an analysis module to de-duplicate the plurality of data streams associated with the entity from the plurality of independently controlled data sources by analyzing the entity attributes associated with the unique entity identifier;

an event classifier module to classify a unified entity event from the plurality of data streams along with dynamic entity attributes retrieved from a memory store, wherein the unified entity event comprises values of the entity attributes;

an attribute generation module to update a plurality of entity attribute documents associated with a plurality of entities by storing the values of the entity attributes from the unified entity event temporally, wherein a new entity attribute document and a new unique entity identifier is created for a new entity in real-time;

a profiler module to reverse search, to match the plurality of entity attribute documents associated with the plurality of entities with a collection of queries for profiling each of the plurality of entities, wherein the collection of queries comprises cohort definition with at least one entity attributes specified in Boolean logic, wherein the plurality of entity attribute documents comprise all values of the entity attributes that have been captured historically; and a cohort creation module to generate, entity cohorts with at least one cohort label based on the matching between the plurality of entity attribute documents and the collection of queries, wherein the entity cohorts are identified based on a searched cohort definition.

12. The system as claimed in claim 11, wherein the collection of queries is associated with the dynamic entity attributes and static entity attributes to account for scalability of new attributes that become available.

13. The system as claimed in claim 11, wherein the system enables integration of a plurality of distributed data sources and new events in real-time without interrupting the flow of the ongoing method, wherein the profiling is performed selectively for the plurality of entities whose values of entity attributes in their entity attribute document have changed above a predefined threshold.

14. The system as claimed in claim 11, wherein the entity attributes comprise at least one of a countable attribute, a categorical attribute, an ordinal, a location, a spatial, or a temporal behavior of an entity, wherein:

the countable attribute comprises at least one of (i) spend levels, or (ii) a frequency of visits;

the categorical attribute comprises at least one of (i) a gender, (ii) age-groups, (iii) a content, or (iv) a content type; and the spatial attribute comprises at least one of (i) residential areas, (ii) regions of interest, or (iii) place categories.

15. The system as claimed in claim 11, wherein the plurality of data streams comprises at least one of (i) non location indexed traffic data, (ii) a digital visit count to global website, or (iii) social media activities.

16. The system as claimed in claim 11, wherein the system employs Lucene search techniques for profiling the entities, wherein the Lucene search techniques match the plurality of entity attribute documents associated with the plurality of entities with the collection of queries and returns a true Boolean value for matching queries.

17. The system as claimed in claim 11, wherein the system configures a machine learning based matching model on the profiler module for profiling real time entities, wherein the machine learning based matching model matches the plurality of entity attribute documents associated with the plurality of entities with a collection of queries and returns a true Boolean value for matching queries.

18. The system as claimed in claim 11, wherein the system determines heterogeneity in the entity attributes using a proprietary language, wherein the proprietary language is defined by (i) the entity attributes (ii) the values for each entity attribute.

19. The system as claimed in claim 11, wherein the plurality of data streams comprises at least one of (i) location pings from one or more application engaged on the one or more entity devices, (ii) access pings from wireless hot-spots, (iii) active subscriber's data & location in different geo-areas (GSM) from a mobile network, and (iv) local information from traffic sensors or a public CCTV camera for security and others.

20. The system as claimed in claim 11, wherein the device processor causes a communication module to communicate a target media content to a plurality of entity devices associated with the entity cohorts over a media vehicle.

* * * * *